United States Patent [19]

Madonia

[11] Patent Number: 4,904,508

[45] Date of Patent: Feb. 27, 1990

[54] TRIM STRIP HAVING LIGHT RESPONSIVE CHARACTERISTICS

[76] Inventor: Ciro Madonia, 195 Healey Rd., Bolton, Ontario, Canada, L0P 1A0

[21] Appl. No.: 134,968

[22] Filed: Dec. 18, 1987

[51] Int. Cl.⁴ .......................... B60R 13/04; E06B 7/16
[52] U.S. Cl. .......................................... 428/31; 49/462;
52/716; 293/128; 428/40; 428/121; 428/122; 428/358
[58] Field of Search .................. 428/31, 121, 40, 122, 428/358; 49/462; 52/716; 293/128

[56] References Cited

U.S. PATENT DOCUMENTS

| | | | |
|---|---|---|---|
| 3,547,515 | 12/1970 | Shanok et al. | 428/31 X |
| 3,924,898 | 12/1975 | Kain | 428/31 X |
| 4,154,504 | 5/1979 | Mohs | 428/31 X |
| 4,232,081 | 11/1980 | Pullan | 428/122 X |
| 4,296,155 | 10/1981 | Madonia et al. | 428/31 |
| 4,387,125 | 6/1983 | Adell | 428/31 |
| 4,431,711 | 2/1984 | Eisfeller | 428/31 |
| 4,446,179 | 5/1984 | Waugh | 428/31 |
| 4,493,806 | 1/1985 | Hatzikelis et al. | 428/31 X |
| 4,528,232 | 7/1985 | Cliffe | 428/31 X |
| 4,546,022 | 10/1985 | Madonia et al. | 428/31 |
| 4,603,065 | 7/1986 | Mori et al. | 428/31 |
| 4,645,556 | 2/1987 | Waugh et al. | 428/31 X |
| 4,646,208 | 2/1987 | Hayashi et al. | 428/31 X |
| 4,748,062 | 5/1988 | Menjo et al. | 428/31 X |

Primary Examiner—Henry F. Epstein
Attorney, Agent, or Firm—Donald E. Hewson

[57] ABSTRACT

A trim strip suitable for attachment to surfaces requiring highlights, such as edges of vehicle moveable closures including doors and trunk lids, is provided with a light reflective surface portion to outline the edge of the moveable closure member. A decorative continuation to the strip surface can be provided that is visible on the outer surface of the moveable closures such as doors. The strip is transversely and longitudinally deformable in order to conform to the usual radii of a door or other mounting surface, and may be of metal, or plastic or other suitable construction. The strip may embody clear protective finishes to minimize ultra-violet degradation of the colored surface. The strip can serve additionally as edge bumper protection and usually incorporates a pressure sensitive adhesive on the obverse surface thereof. However, mechanical attachment may be used, to attach the strip to the surface being highlighted. A surface discontinuity or ridge may be provided to separate the two adjoining visual finish surfaces. The highlight surface of the strip can incorporate, reflective or fluorescent or a combined reflective and fluorescent finish, to afford visual highlighting under predetermined lighting condition.

11 Claims, 1 Drawing Sheet

TRIM STRIP HAVING LIGHT RESPONSIVE CHARACTERISTICS

BACKGROUND OF THE INVENTION

This invention is directed to a light responsive safety trim strip, suitable for a wide range of applications, including use as a protective door edge trim for automotive vehicles.

In the quest for enhanced safety the use of light reflective material has been adopted, particularly in regard to automotive vehicles.

SUMMARY OF THE INVENTION

The present invention provides a light responsive trim strip adapted for application to surfaces requiring to be highlighted such as the edges of vehicle doors and trunk lids, to provide in use a light responsive surface outlining the edge of the aperture when opened, to make the presence of the aperture more readily discernable especially under poor lighting conditions.

The subject trim further provides in one embodiment an attractive decorator surface for the surface normally visible outside the vehicle, to encourage the adoption of the subject safety feature, without detracting from the aesthetic appearance of the vehicle to the owner.

A further application of the subject trim strip, utilizing a reflective and/or fluorescent type of light responsive coating, is to provide light responsive safety guidance, as in the case of aircraft aisles.

The subject trim furthermore provides these protective aspects of function normally associated with door edge trim.

The subject trim can be manufactured in plastic, metal or other suitable materials or combinations thereof, one embodiment being in strip form of extended length, for ready dispensing, normally in roll form by way of a flexible material. However, discrete lengths of rigid trim strip are also contemplated.

The use of contact adhesive on the attachment surface of the trim strip is usually provided, together with a peelable protective release sheet over the adhesive. However, the use of non-flexible base material which may not require adhesive also is contemplated, wherein mechanical attachments also may be relied upon.

BRIEF DESCRIPTION OF THE DRAWINGS

Certain embodiments of the invention are described, reference being made to the accompanying drawings, wherein.

DETAILED DESCRIPTION OF THE DRAWINGS

Figure 1:
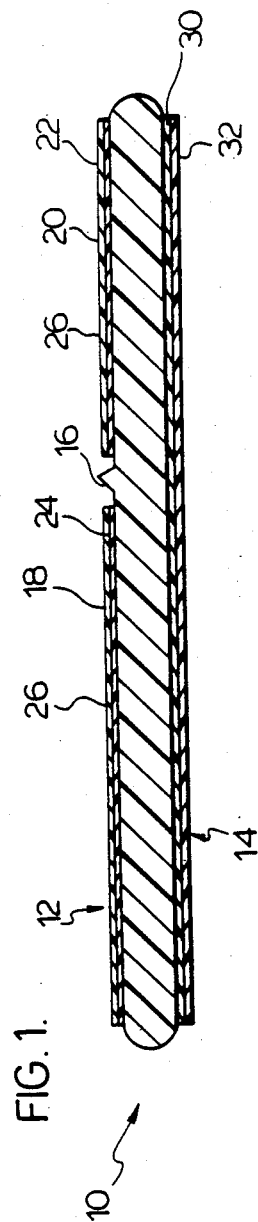
FIG. 1 is a cross sectional view of one embodiment of the subject trim.
Figure 2:
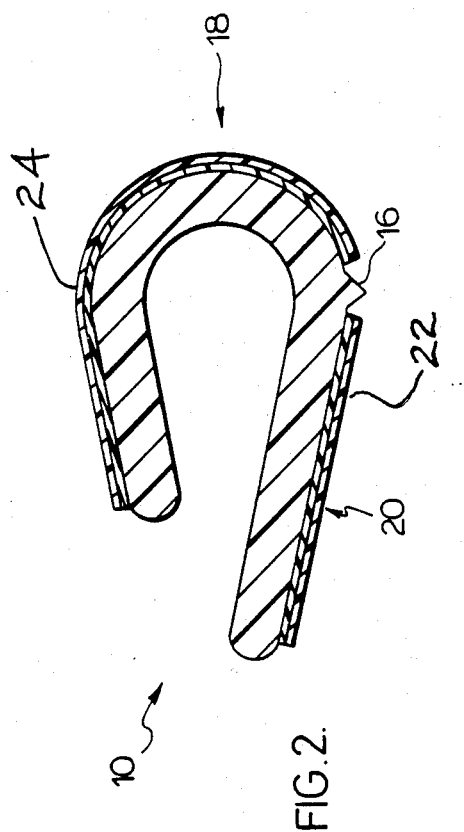
FIG. 2 is a typical cross-section of the subject trim as if shaped to conform to a door edge of a vehicle.

Referring to the drawings, the strip 10, which may be of extruded plastic of indeterminate length, has a decorative face 12, and a concealable face 14. The face 12 is shown divided by a ridge 16 which extends along the length of the trim and forms a discontinuity for the decorative face 12, dividing it into a major surface 18 and minor surface 20.

The surface 20 is provided with a light responsive, namely reflective surface finish 22 such as a metallized material or reflective tape. In the case of the extruded plastic embodiment, this reflective surface 22 may be adhered thereto simultaneously with the extrusion of the section, by laminating.

Similarly, a decorative surface 24 on the surface 18, that is compatible with car interior trim may be laminated thereto simultaneously with the extrusion process.

A clear protective finish 26 to minimize ultra violet degradation also may be applied.

In the case of metal foil constructions, while plastic extrusion techniques no longer apply, the colouration and protective laminated coat applications are similar.

An adhesive layer 30, with strippable protective layer 32, such as applied by known techniques, is illustrated.

It will be understood that the thickness of the respective coatings as illustrated are exaggerated.

A wide range of light responsive material may be laminated to the trim strip, ranging from exclusively reflecting material to substantially exclusively fluorescent material, and extending to include laminations incorporating selected combinations of both reflecting and fluorescent characteristics.

What I claim by letters patent of the United States is:

1. A light responsive trim strip for adherent application to a rigid surface, comprising: an elongated plastic strip having a coating of contact adhesive on a first major surface of the strip; a longitudinally extending discontinuity on a second major surface of the strip, so as to divide said second major surface into two longitudinal surface portions; said strip being adapted to be bendable along a longitudinal bend line so as to incline one of said longitudinal portions with respect to the other said longitudinal portion; and light responsive material laminated to at least one of said longitudinal portions; said longitudinally extending discontinuity and said longitudinal bend line being substantially coincident, and being defined by a longitudinal extending ridge-like element between said two longitudinal surface so as to cause a gap between them; so that in use, said strip may adhere to longitudinally adjacent rigid surfaces to provide visual demarcation under predetermined lighting conditions of one of said rigid surfaces.

2. The trim strip as set forth in claim 1 wherein said strip may be permanently deformed in use to provide adherent mechanical attachment to a movable closure member.

3. The trim strip as set forth in claim 1, said trim strip being of non-rigid plastic, said light responsive material being light reflecting.

4. The trim strip as set forth in claim 1, said trim being of non-rigid plastic, said light responsive material being fluorescent.

5. The trim strip as set forth in claim 1, said first and second major surfaces comprising a decorative face and an attachment face respectively, wherein said two longitudinal surface portions on said second major surface comprise a light responsive portion extending for a portion of the width of the strip and a decorative portion extending for a further portion of the width of said strip.

6. The trim strip as set forth in claim 1, wherein said light responsive material comprises a combined light reflective and fluorescent characteristics.

7. The trim strip as set forth in claim 3, said non-rigid plastic strip having said longitudinally extending discontinuity extending along the length thereof remote from said contact adhesive, to provide separation between said light responsive material and a strip of other decorative material.

8. A light responsive trim strip for attachment in edge enclosing relation to a surface edge portion of a thin rigid body, in edge demarking relation therewith, said strip having a U-shaped cross section comprising a curved portion having two unequal legs extending therefrom; the shorter one of the legs having a decorative surface extending about the outer periphery of said curved portion and terminating adjacent the other, longer one of said legs; said longer leg having light responsive material adhered to the outer surface thereof; there being a discontinuity between said decorative surface and said light responsive material defined by a ridge-like element which forms a gap therebetween.

9. The light responsive trim strip as set forth in claim 8, said curved portion thereof including attachment means for adherently engaging said body edge portion.

10. The light responsive trim strip as set forth in claim 9, said rigid body comprising a vehicle door.

11. The light responsive trim strip as set forth in claim 10, in combination with said vehicle door.

* * * * *